Sept. 12, 1933.  W. L. PAUL  1,926,401
PLOW
Filed Dec. 12, 1929   3 Sheets-Sheet 3

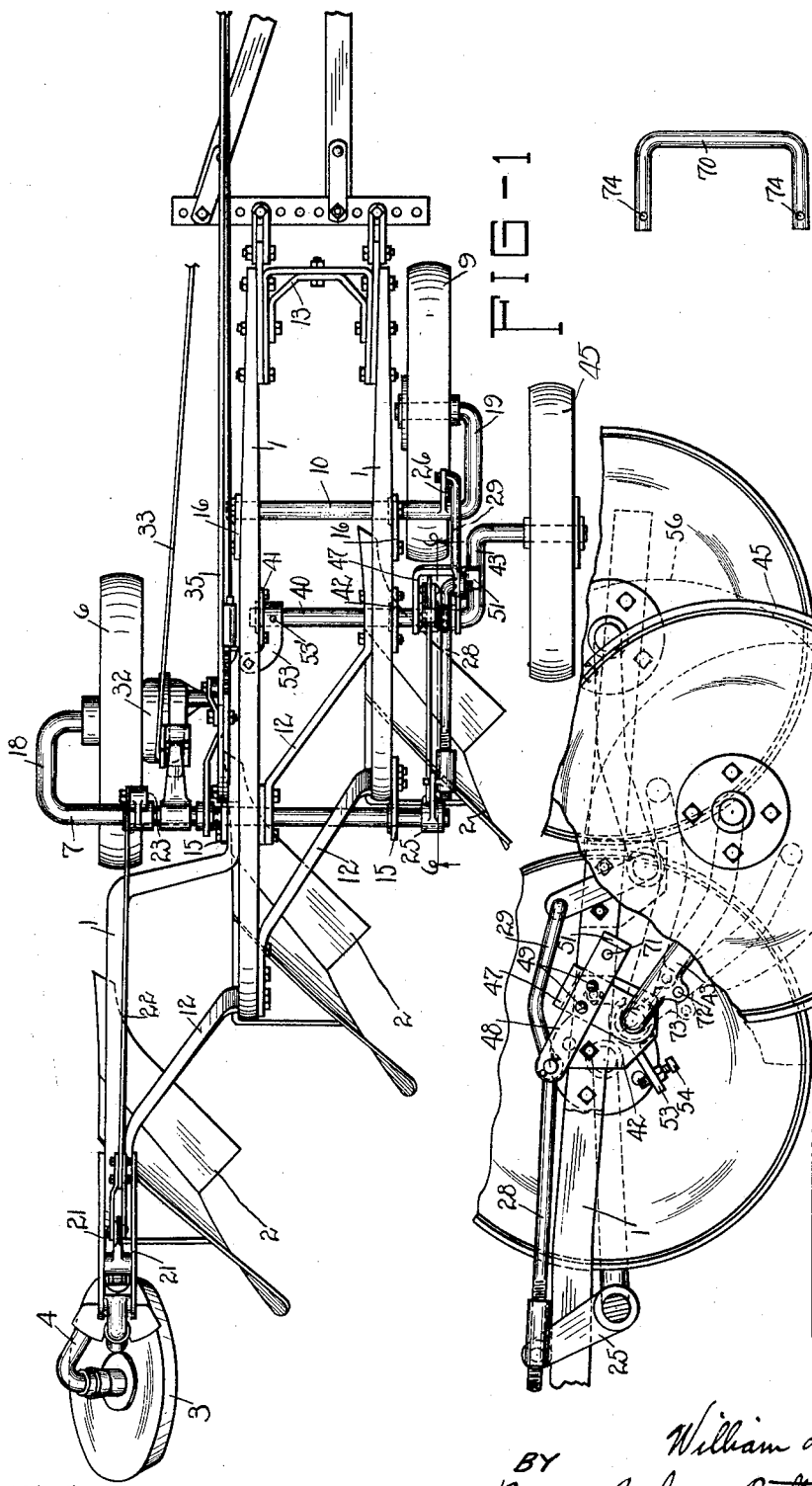

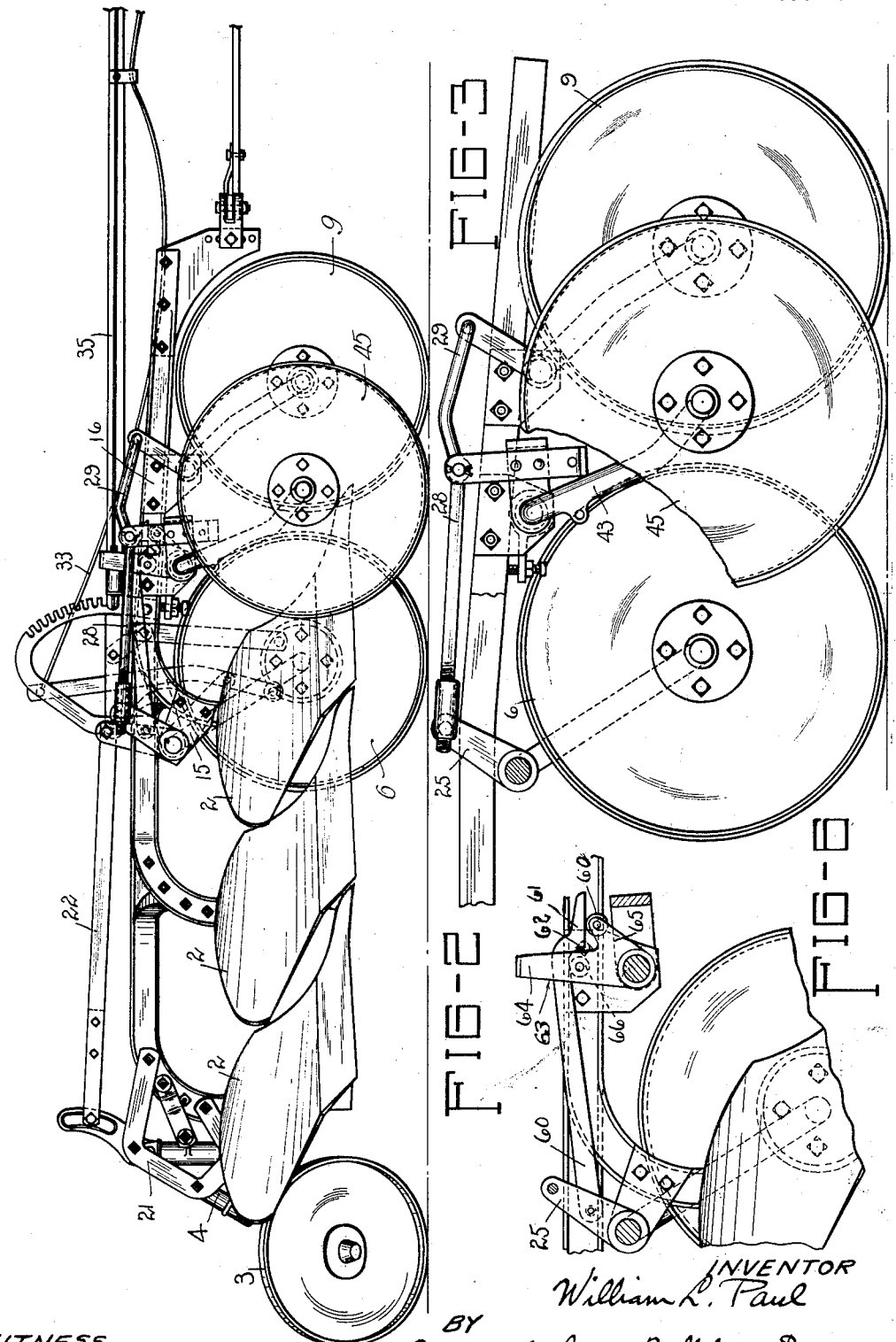

INVENTOR
William L. Paul
BY
Brown, Jackson, Boettcher & Dienner
ATTORNEYS

WITNESS
Walter Ackerman

Patented Sept. 12, 1933

1,926,401

UNITED STATES PATENT OFFICE 1,926,401

PLOW

William L. Paul, Berkeley, Calif., assignor to Deere & Company, Moline, Ill., a corporation of Illinois Application December 12, 1929
Serial No. 413,459

34 Claims. (Cl. 97—73)

The present invention relates to wheeled plows, and has to do with improved means for maintaining the plow substantially level and for guiding the plow to prevent accidental lateral shifting thereof so that the width of cut is not materially varied. The present invention also relates to an improved construction of plows wherein depth adjustments are more easily and conveniently made and maintained.

The ordinary wheeled plow is usually provided with a rear furrow wheel, a front furrow wheel, and a land wheel, and it sometimes occurs that during the operation of the plow it will tend to shift laterally so that the front furrow wheel climbs up either on the land or on the plowed ground, thus tending to raise the plow bodies out of the ground.

This condition is not conducive to good plowing, because, as will be understood, the moment the plow shifts so as to cause the front furrow wheel to ride up on the land or on the plowed ground the depth adjustment is destroyed. Also, in plows of this type, having a front furrow wheel, it is necessary when opening up a land to raise the front furrow wheel the first round in order to have the adjacent plow body in the ground, for normally the front furrow wheel runs in a furrow and is practically level with the plow body, but when opening up a land there is no furrow in which the front furrow wheel can run.

It is therefore the principal object of my invention to provide means in the first place, acting to maintain the plow substantially level with the land at practically all times, regardless of the course taken relative to a previously made furrow, and in the second place, to provide for gauging the depth of plowing by means running principally on the land, so that after the first round the operator may drop the plow into the opened furrow without making further adjustments on the plow. In the embodiment illustrating my invention, part of the structure I have provided to perform these functions acts independently of the usual depth adjustment means provided on the plow, and also it is operative in tending to prevent the plow from accidentally shifting laterally off its course while not preventing the operator from steering the plow in a desired direction.

Briefly, my invention contemplates the substitution of a wheel adapted to run on the land for the usual front furrow wheel. This wheel, in conjunction with the usual land wheel on the plow, serves to maintain the plow level with the land, That is, as long as these two wheels run on the land there will not be any lateral tipping of the plow. In connection with these two land wheels I contemplate the provision of a third wheel, spaced laterally with respect to the two mentioned wheels a distance in the neighborhood of a furrow width, so that in effect wheel means is provided which has a tread of a width equal to the width of the furrow. This third wheel in my preferred embodiment, when in normal operation is adapted to be in or over the last furrow made on the preceding round. If, however the plow shifts laterally toward the plowed ground, either accidentally or by being so steered by the operator, this third wheel will ride up thereon and support the plow in lieu of the adjacent land wheel which, under the conditions assumed, may be shifted laterally over the furrow so that, were it not for the provision of the third wheel, the second wheel would fall into the furrow and the plow would be tilted.

I contemplate also the provision of means adapted to allow the third wheel to be floatingly supported for free up and down movement, so that this wheel may follow down the furrow and tend to guide the plow by bearing against the furrow wall or against the wall of the plowed land when the plow tends to shift laterally.

One important feature of my invention is that due to the presence of the two land wheels the ordinary leveling lever may be eliminated since the relation of these two land wheels is not affected by any change of adjustment in the depth of plowing. Thus when the depth of plowing is once adjusted it need not be changed when opening up the land.

Other objects and advantages of my invention will be apparent to those skilled in the art after a consideration of the following detailed description taken in conjunction with the accompanying drawings, in which:

Figure 1 is a plan view of my improved plow;

Figure 2 is a side elevation of the plow in raised position;

Figure 3 is a fragmentary side elevation on an enlarged scale and showing the three land wheels when the plow is in raised position;

Figure 4 is a view similar to Figure 3 except that the plow is shown in plowing position;

Figure 5 is a view of a link for use when the normally floating wheel is to be carried by the plow, which may be done when it is desirable to add the weight of this wheel to the plow under normal operating conditions;

Figure 6 is an enlarged fragmentary cross-sectional view taken along the line 6—6 of Figure 1.

Figures 7, 8:
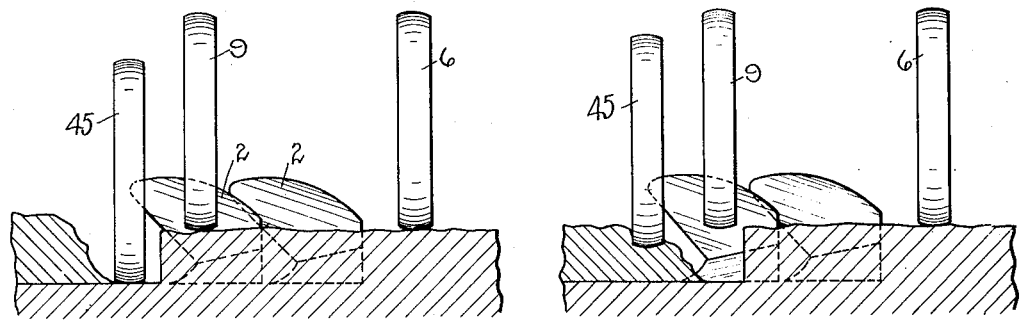
Figure 7 to 11, inclusive, are diagrammatic sketches showing the different positions the plow may take under various operating conditions.

Referring to the drawings, the plow comprises the usual means 1 for supporting the plow bodies 2, the rear furrow wheel 3 journaled in a supporting crank 4, the land wheel 6 mounted on a crank axle 7, and the right-hand land wheel 9 journaled on a crank axle 10. The plow beams 1 are connected together by suitable braces 12 and a front U-shaped bracket or yoke 13 so as to constitute the frame of the plow. The crank axles 7 and 10 are journaled in bearing brackets 15 and 16, which are bolted or otherwise secured to the plow beams 1. These crank axles 7 and 10 are respectively provided with crank portions 18 and 19 which, at their ends, are inwardly directed so as to form a bearing for the land wheels 6 and 9.

The crank arm 4 for the rear furrow wheel 3 is also mounted for up and down swinging movement, as by links 21, which are connected by a link 22 to the crank axle 7, the latter being provided with an arm 23 rigidly fixed thereto and to which the link 22 is pivoted at its forward end. The crank axle 7 is provided with a second arm 25 rigidly fixed thereto, and the crank axle 10 is provided with an arm 26, extending upwardly therefrom and preferably formed integral therewith, and these two last mentioned arms are connected to move together by means of a pair of links 28 and 29 as best shown in Figure 3.

By reason of this connection between the crank axles 7 and 10, comprising the links 28 and 29, these two axles move in unison at all times, and since they both ride on the land under normal operating conditions they cooperate with each other to maintain the plow level with the land at all depths. If neither of the wheels 6 and 9, mounted respectively on the crank axles 7 and 10, operate in the furrow it is obvious that there is no need for any leveling means such as is usually required in order to adjust the position of the wheel usually operating in the furrow relative to the land wheel to accommodate for the particular depth of plowing employed. The wheel 6 carries the usual half revolution clutch 32 which is adapted, when tripped by the line 33 to cause the rearward rocking of the crank 18. This motion is transmitted by the links 28 and 29 to the forward crank 19 and by the links 22 to the rear furrow wheel crank 4 whereby to raise the plow bodies to transport position, as shown in Figure 2. The usual depth adjusting means 35 is provided for adjusting the depth of plowing.

I shall now describe the means I have provided for preventing the plow, described above, from shifting laterally on its course and also the means by which the plow is maintained substantially level with the land when, due to any reason whatsoever, the plow does actually become laterally displaced. A crank axle 40 is journaled to the plow beams 1 by means of bearing brackets 41 and 42.

The crank axle 40 is provided with a crank 43 on the outer end of which is journaled the auxiliary wheel 45. On the crank axle 40, a U-shaped bracket 47 is journaled, the ends of the arms of the bracket 47 being provided with bearing openings through which the crank axle 40 extends. On the outer side of the bracket 47 an arm 48 is secured, as by rivets 49. The arm 48 is pivoted to the links 28 and 29, as shown in Figure 4, the link 28 at its front end having a laterally bent portion which projects into a perforation in the upper end of the arm 48. The link 29 has a perforation at its rear end which embraces the laterally bent portion of the link 28 inside of the arm 48.

The crank axle 40 is free to turn to permit the auxiliary wheel 45 to rise and fall within certain limits when the plow is in operating position. When the plow is adjusted for shallow plowing, that is, when the cranks 4, 18 and 19 are more nearly vertical, the upward movement of the auxiliary wheel 45 is limited by the crank portion striking the laterally extending projection 51 of the arm 48. When the plow is adjusted for deep plowing, the cranks 4, 18 and 19 will be more nearly horizontal, and the upward movement of the wheel 45 is limited by the crank 43 striking the crank axle 10.

A bracket 53 is secured, as by a pin 53', to the left hand end of the crank axle 40, and the bracket 53 is provided with a laterally bent portion which extends under the left hand plow beam 1 and is provided with a bolt 54 screw-threaded into and through the laterally bent portion so as to provide an adjustable stop means for limiting the downward movement of the auxiliary wheel 45.

The extreme positions of the wheel 45 when the plow is set for deep plowing are shown by the dotted circles 56 and 57 in Figure 4.

It will be noted that the bracket 47 is connected with the links 28 and 29 so that whenever the clutch 32 is operated to rock the cranks 4, 18 and 19 whereby to raise or lower the plowbodies the bracket 47 is rocked through substantially the same angle. The crank 43 and wheel 45 are floatingly supported, that is, they are free to rise and fall within the limits established by the laterally extending projection 51 and the bolt 54. It may happen, as when the plow is set for shallow plowing, that when the clutch is tripped to drop the plow bodies the crank axle 40 might fail to crank forward and thus prevent the plow from dropping to working position. In order to positively effect the forward rocking of the crank axle 40 special means may be provided for forcing the crank axle 40 forwardly at this time. A link 60 is pivotally connected at its rear end to the arm 25 and is provided at its front end with a down-turned portion 61 forming a hook 62 on its under side. A bell crank 63 having two pairs of arms 64 and 65 is fixed to the crank axle 40. A roller 66 is journaled between the arms 64, and a second roller 67 is journaled between the arms 65. The arms 64 extend upward beyond the roller 66, and at its upper end the outside arm is bent over laterally to form a stop for the link 60.

The link 60 extends between the arms 64 and it rests on the roller 66 when the plow is in a raised position, as shown in Figure 6. When the clutch 42 is tripped to lower the plow and the crank axle 7 is forced forwardly, either by the movement of the clutch or by any other means which may be provided to effectively cause the forward rocking of the crank axle 7, the link 60 exerts a rearward pull on the roller 66 which forces the crank axle 40 to crank forwardly to thereby enable the plow bodies to be lowered. After the crank axle 40 has been forced forwardly to a position where there is no danger of its holding up the weight of the plow, the roller 67 is adapted to engage the under side of the down-turned portion 61 and to raise the link 60, thus disengaging it from the roller 66 so that thereafter the wheel 45 may be floatingly supported for free up and down movement.

The operation of the plow may best be explained by referring to Figures 7 to 11 inclusive. In these figures a two-bottom plow is illustrated, rather than a three-bottom as shown in Figures 1 and 2, for the sake of simplicity. These figures are drawn as looking at the front of the plow, and for this reason the right hand wheel 9 of the plow appears near the left hand of the figures.

The wheel 45 is the normally floating auxiliary wheel. Normally the plow bodies 2 are held in a level position, and the depth of plowing is gauged by the wheels 6 and 9, as shown in Figure 7. The auxiliary wheel 45 normally rides in the bottom of the furrow and is free to rise and fall as it meets obstructions and depressions in the furrow. When this wheel 45 is riding in the bottom of the furrow under normal operating conditions, such as is illustrated in Figure 7, this wheel aids considerably in maintaining the plow straight and preventing it from varying the width of its cut by exerting a side pressure, either against the plowed land or the furrow wall. The wheel 45 climbs up on the plowed land, as shown in Figure 8, or upon the unplowed land, as shown in Figure 9, only when the plow is deliberately steered to one side or the other.

For example, should the operator find it necessary to turn to the right to avoid a tree or other obstruction to such an extent that the wheel 9 will then extend over and into the furrow, the auxiliary wheel 45 will be forced to climb up on the plowed land, whereupon it will carry the weight of the right-hand side of the plow and thus maintain the plow bodies substantially level, as shown in Figure 8. If the operator should find it necessary to steer the plow to the left to avoid an obstruction the auxiliary wheel 45 will be forced up on to the land and again carry the weight of the plow, as shown in Figure 9.

Figures 9, 10:
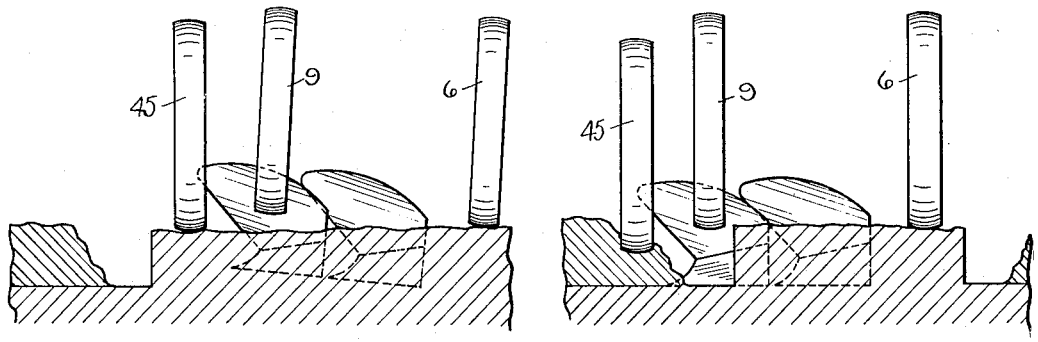

It will be noted from Figure 9 that when the wheels 45 and 6 are supported upon the land the plow is slightly tilted, the right side of the plow being slightly higher than the left-side. This difference in height between wheels 45 and 9 and 6 varies with the depth, decreasing as the depth of plowing is decreased. While for all practical purposes the plow in this position is substantially level, the plow will probably be exactly level when it is shifted toward the plowed land, as illustrated in Figure 8, due to the fact that there is a tendency for the wheel 45 to sink slightly into the soft plowed land. It is obvious, of course, that the upper limited position of the wheel 45 may be so fixed that the wheel 45 is directly level with the wheels 6 and 9. I prefer, however, to employ the construction arranged as shown, first, for the reason that it does not often occur that the auxiliary wheel 45 is supported on the land and, second, for the reason that the slight tilting, as indicated in Figure 9, is beneficial when opening up the land. When this occurs it may not be desirable to operate the plow bodies exactly level, for the reason that it may be too great a load to attempt to operate the plow exactly level and to the desired depth the first round because the right hand plow body in Figure 1—left hand plow body in Figures 7 to 11 inclusive—would be required to lift the earth above the land, whereas in normal plowing the earth is merely turned over into the last furrow made on the preceding round and not lifted above the land any great amount. If the plow is tilted slightly so that the front bottom or front plow body is shallower than the rear bottom the draft is reduced slightly.

Figure 11:
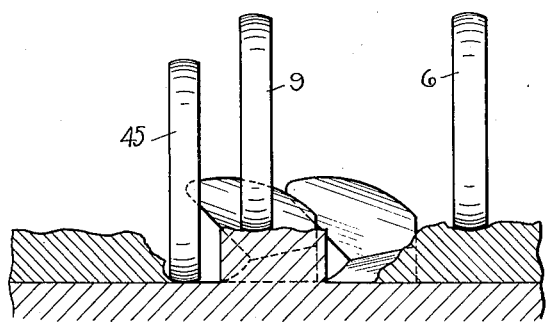

Figures 10 and 11 show the manner in which the operator should finish plowing when a strip remains a little wider than the plowing width of the plow, as is represented in Figure 10. In such case the operator should plow about two-thirds of the remaining strip, which will again cause the auxiliary wheel 45 to ride on the plowed land and hold the plow level, or substantially so. On the next round he will plow the remaining strip, as shown in Figure 11, in which case wheel 9 rides on the remaining strip and wheel 6 rides up on the plowed land on the left-hand side.

Under certain conditions it may be desirable to equip the plow with disc furrow openers, and in this case the operator may wish to sacrifice the guiding function of the auxiliary wheel 45 for the purpose of adding its weight to the weight of the plow. When such is desired, the wheel 45 may be normally carried by means of a link 70, shown in Figure 5. One end of the link 70 may be inserted in the hole 71 provided in the lower end of arm 48 and the other end in the hole 72 provided in the lug 73 on the under side of the crank 43. The link 70 is adapted to be held in position by means of cotter pins placed in holes 74 in the ends of the link 70. When the link 70 is employed the bolt 54 is turned back.

Many modifications will be suggested to those skilled in the art. For example, the wheel 45 may be placed on the same axle with wheel 9, with the two wheels spaced laterally the same distance they are spaced in the drawings, thus eliminating the crank axle 40. In such a structure the wheel 45 would not have the function of preventing the plow from shifting laterally, as has the wheel 45 of the structure shown in the drawings, but it would function to carry the weight of the plow if it were steered off its course.

Figure 12:
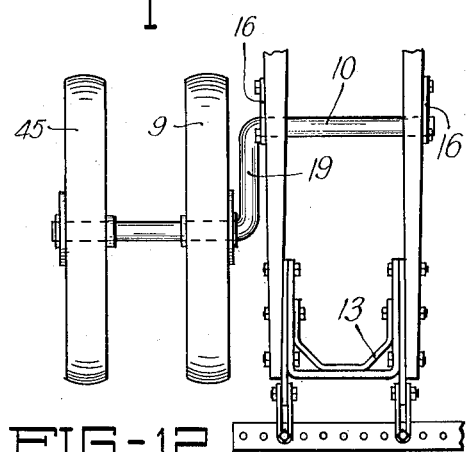
Figure 12 shows a modified form of construction.

This form is illustrated in Figure 12. I contemplate, also, the substitution of a single wheel for the two wheels 9 and 45, forming the single wheel with tread means of a width comparable to the distance between the inner edge of wheel 9 and the outer edge of wheel 45.

While I have described, in connection with the accompanying drawings, the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:

1. In a plow, the combination of one or more plow bodies and means for supporting the plow, including wheel means having tread portions of a lateral dimension equal to or greater than a furrow width for supporting the plow either on the unplowed land or on the top of the plowed land in elevated relationship from the bottom of a furrow.

2. In a plow, the combination of one or more plow bodies, and means for supporting the plow, including a land wheel at one side of the plow and wheel means at the other side of the plow having tread portions of a lateral dimension equal to or greater than a furrow width at that side of the plow for supporting the plow either on the unplowed land or on top of the plowed land in elevated relationship from the bottom of the adjacent furrow.

3. In a plow, the combination of one or more plow bodies and means for supporting the plow, including a pair of wheels at one side of the plow, said wheels being spaced apart a distance equal substantially to the width of a furrow, and parallel closely spaced crank axles for the wheels so that the crank portion of one axle can swing against the other axle.

4. In a plow, the combination of one or more plow bodies and means for supporting the plow, including a pair of land wheels, one wheel at each side of the plow, and each adapted to run on the land to be turned by the plow bodies, crank axles for said land wheels, and a third supporting wheel for the plow spaced laterally from one of said land wheels a distance approximately equal to a furrow width, said one land wheel being positioned directly forward of one of said plow bodies and said third wheel being normally in line with a previously opened furrow.

5. A plow comprising the combination of one or more furrow openers, means for supporting said furrow openers including means acting as a frame and ground engaging wheels carried by said frame and directly forward of the furrow openers, crank means pivotally supporting said wheels on said frame, and means to adjust the depth of plowing including means interconnecting said crank means and having a member journaled on one of the axles for rotation relative thereto.

6. In a wheeled plow, the combination of a frame, plow bodies carried thereby, supporting wheels for the frame and adapted to run on the land to maintain the plow in level plowing position, the plow tending to shift laterally off its course and thereby running one of the wheels off the land causing tilting of the plow, and means tending to prevent accidental lateral shifting of the plow and adapted to automatically maintain the plow level with the land when the plow is off its course, said means comprising a crank axle pivoted to the frame and a wheel journaled to the crank portion of the axle and adapted to operate in a furrow opened by the plow.

7. In a wheeled plow, the combination of a frame, plow bodies carried thereby, supporting wheels for the frame and including a land wheel, said wheels being located forward of the plow bodies, and means cooperating therewith to maintain the plow level with the land, said means comprising a crank axle pivoted to the frame and a wheel journaled to the crank portion of the axle and adapted to operate in a furrow opened by the plow.

8. In a wheeled plow, the combination of a frame, plow bodies carried thereby, supporting wheels for the frame and including a land wheel, and means cooperating therewith to maintain the plow level with the land, said means comprising a crank axle pivoted to the frame and a wheel journaled to the crank portion of the axle and adapted to operate in a furrow opened by the plow, said crank axle being limited in its upward pivoting whereby to position said last mentioned wheel in a position substantially level with said land wheel.

9. In a wheeled plow, the combination of a frame, plow bodies carried thereby, supporting wheels for the frame, and means cooperating therewith to maintain the plow level with the land, said means comprising a wheel swingingly supported from the frame and adapted to operate in a furrow opened by the plow when the latter is in normal position and adapted to operate on the top surface of the soil and support the plow level when in laterally shifted position.

10. In a wheeled plow, the combination of a frame, plow bodies carried thereby, supporting wheels for the frame, and means cooperating therewith to maintain the plow level with the land, said means also tending to prevent lateral shifting of the plow, said means comprising a wheel swingingly supported from the frame for limited vertical movement when positioned over a previously opened furrow and adapted to operate on the land and to support the plow when the latter is in a laterally shifted position, said means also including means for limiting the upward movement of said wheel.

11. In a wheeled plow, the combination of a frame, plow bodies carried thereby, supporting wheels for the frame, including a land wheel and means cooperating therewith to maintain the plow level with the land, said means also tending to prevent lateral shifting of the plow, said means including a wheel swingingly supported from the frame for limited free vertical movement when in a furrow opened by the plow, and means for limiting the upward movement of said last mentioned wheel to a position substantially level with said land wheel whereby when the plow is shifted laterally it is supported in substantially level position by contact of said swingingly supported wheel with the top surface of the soil.

12. In a wheeled plow, the combination of a plurality of plow bodies, supporting means therefor, and means normally positioned for vertical floating movement in a previously opened furrow but adapted to cooperate with the supporting means to cause the front one of said plow bodies to run shallower than the rear one of said bodies when opening up the land.

13. In a wheeled plow, the combination of a plurality of plow bodies, supporting means therefor, and means normally positioned for vertical floating movement in a previously opened furrow but adapted to cooperate with the supporting means to cause the front one of said plow bodies to run shallower than the rear one of said bodies when opening up the land, said means comprising a crank axle carried by said supporting means and a wheel mounted on the crank portion of said axle.

14. In a wheeled plow, the combination of a plurality of plow bodies, supporting means therefor, lifting means to raise and lower said plow bodies to and from transport position, mechanism comprising a crank axle carried by said supporting means and a wheel mounted on the crank portion of said axle and operative to cause the front one of said plow bodies to run shallower than the rear one of said plow bodies when initially opening up the land, and means whereby said mechanism is controlled by said lifting means.

15. In a wheeled plow, the combination of a plurality of plow bodies, supporting means therefor, lifting means cooperating with said supporting means to raise and lower said plow bodies to and from transport position, a crank axle pivotally carried by said supporting means and having a wheel mounted on the crank portion, said wheel being adapted to maintain the plow level when the plow is shifted laterally off its course, and means to effect an upward rocking movement of said crank axle when said plow bodies are lowered to plowing position.

16. In a wheeled plow, the combination of a plurality of plow bodies, supporting means therefor including wheels and crank axles for the wheels, means to lift said plow bodies to transport position by swinging said crank axles, another crank axle pivotally mounted on the plow for free rocking movement and having a wheel mounted on the crank portion thereof, and means positioned by said other lifting means to limit the upward rocking movement of said pivoted crank axle.

17. In a wheeled plow, the combination of a plurality of plow bodies, supporting means therefor, means to lift said plow bodies to transport position, a crank axle pivotally carried by said supporting means and having a wheel mounted on the crank portion thereof, and means positioned by said lifting means to limit the upward rocking movement of said pivoted crank axle, said crank axle having means to limit its downward movement.

18. In a wheeled plow, the combination of a plurality of plow bodies, supporting means therefor, means to lift said plow bodies to transport position, a crank axle pivotally carried by said supporting means and having a wheel mounted on the crank portion thereof, means positioned by said lifting means to limit the upward rocking movement of said pivoted crank axle, and means actuated by the return of said plow bodies to plowing position to effect an upward rocking movement of said crank axle.

19. In a wheeled plow, the combination of a plurality of plow bodies, supporting means therefor, means to lift said plow bodies to transport position, a crank axle pivotally carried by said supporting means and having a wheel mounted on the crank portion thereof, means positioned by said lifting means to limit the upward rocking movement of said pivoted crank axle, and means actuated by the return of said plow bodies to plowing position to effect an upward rocking movement of said crank axle, said means including releasable mechanism adapted to allow the crank axle to be swingingly supported for up and down movement when in plowing position.

20. In a wheeled plow, the combination of a plurality of plow bodies, supporting means therefor, a pair of crank axles pivoted to the supporting means, wheels mounted on the crank portions of said axles, means to raise the plow bodies to transport position including a clutch mechanism mounted on one of said wheels and adapted to swing said crank axles, connecting means adapting said axles to swing together, a third crank axle pivoted to the supporting means, an auxiliary wheel mounted on the crank portion of said third crank axle and spaced laterally from the plane of either of said first mentioned wheels, and means positioned by said connecting means to limit the upward movement of said third crank axle.

21. In a wheeled plow, the combination of a plurality of plow bodies, supporting means therefor, a pair of crank axles pivoted to the supporting means, wheels mounted on the crank portions of said axles, means to raise the plow bodies to transport position including a clutch mechanism mounted on one of said wheels and adapted to swing said crank axles, connecting means adapting said axles to swing together, a third crank axle pivoted to the frame, an auxiliary wheel mounted on the crank portion of said third crank axle and spaced laterally from the plane of either of said first mentioned wheels, means positioned by said connecting means to limit the upward movement of said third crank axle, and means to limit the downward movement of said third crank axle.

22. In a wheeled plow, the combination of a plurality of plow bodies, supporting means therefor, a pair of crank axles pivoted to the supporting means, wheels mounted on the crank portions of said axles, means to raise the plow bodies to transport position including a clutch mechanism mounted on one of said wheels and adapted to swing said crank axles, connecting means adapting said axles to swing together, a third crank axle pivoted to the frame, an auxiliary wheel mounted to the crank portion of said third crank axle and spaced laterally from the plane of either of said first mentioned wheels, means positioned by said connecting means to limit the upward movement of said third crank axle, and means to limit the downward movement of said third crank axle, said first mentioned limiting means being adapted to hold said third crank axle against the last mentioned limiting means when the plows are in transport position.

23. A wheeled plow comprising the combination of at least one plow body, supporting means therefor including forwardly mounted wheels positioned to run on the land to be plowed by said plow body, lifting means to raise and lower said plow body to and from transport position, auxiliary supporting means for said plow and comprising a crank axle and a wheel mounted on the crank portion thereof, said wheel being normally positioned to run in the plane of a furrow opened on the previous round, and means adapted to connect said crank axle to said lifting means to be operated in cooperation therewith.

24. A wheeled plow comprising at least one plow body, supporting means therefor comprising at least two forward land wheels, laterally spaced one from the other, whereby the plow is maintained level with the land, and a rear furrow wheel connected with said land wheels, means to raise and lower said plow body with respect to the said wheels and means for gauging the depth of plowing of the plow including a ground engaging member disposed slightly below said land wheels and laterally thereof in a position normally over a previously turned furrow, so that after the first round the operator may drop the plow into the opened furrow without necessitating the making of a different depth adjustment from that used in making the first round.

25. In a wheeled plow, the combination of one or more furrow openers, supporting means therefor, and means for gauging the depth of plowing including a plurality of laterally spaced wheels, one of said wheels being adapted to run in the plane of a previously opened furrow and the other wheels being adapted to run on the land, said one wheel being adapted to run on the surface of the soil and to support that side of the plow when the latter is displaced laterally with respect to said previously opened furrow, whereby there is at all times at least two of such wheels operative to run on the top surface of the soil.

26. In a plow, the combination of one or more plow bodies, and apparatus for supporting the plow comprising two land wheels adapted to run on the surface of the ground and an interconnected auxiliary supporting member disposed slightly below the level of and laterally with respect to said land wheels, which means, with the same setting, thereby permits of opening up a furrow and also plowing level after the furrow is opened.

27. In a plow, in combination, one or more plow bodies, and supporting means therefor, said means comprising a pair of vertically adjustable ground contacting members adapted to run on the land in advance of the portion to be plowed and another ground contacting member adapted to ride over a previously opened furrow, said last named member being positioned relatively to the other members so that the plow is arranged for opening up the land when said one member runs on the land.

28. In a plow, in combination, one or more plow bodies, and supporting means therefor, said means comprising a pair of vertically adjustable ground contacting members adapted to run on the land in advance of the portion to be plowed and another ground contacting member adapted to ride over a previously opened furrow, said last named member being positioned slightly below the other members, whereby the plow is tilted laterally when said member runs on the land.

29. In a plow, in combination, one or more plow bodies, and supporting means therefor, said means comprising a pair of vertically adjustably ground contacting wheels adapted to run on the land in advance of the portion to be plowed and another ground contacting wheel adapted to ride over a previously opened furrow, said last named wheel being spaced vertically a slight distance relatively to the other wheels whereby the plow is tilted laterally when said other wheel runs on the unplowed land, and interconnected means for simultaneously moving said wheels vertically.

30. In a plow, in combination, one or more plow bodies, and supporting means therefor, said means comprising a pair of vertically adjustable ground contacting members adapted to run on the land in advance of the portion to be plowed, one of said members being directly forward of the first plow body, and another ground contacting member adapted to ride over a previously opened furrow, said last named member extended furrowward of said one member a distance substantially equal to the width of a furrow.

31. In a wheeled plow, the combination of a plurality of plow bodies, supporting means therefor, a pair of crank axles pivoted to the supporting means, wheels mounted on the crank portions of said axles, means to raise the plow bodies to transport position by swinging said crank axles, means interconnecting said axles, a third crank axle pivoted to the frame, an auxiliary wheel mounted on the crank portion of said third crank axle and spaced laterally from the plane of either of said first mentioned wheels, a bracket journaled on said third crank axle and cooperating with the crank axle to control the position thereof, and means connecting said bracket to swing with said pair of crank axles.

32. In a wheeled plow, the combination of a plurality of plow bodies, supporting means therefor, a pair of crank axles pivoted to the supporting means, wheels mounted on the crank portions of said axles, means to raise the plow bodies to transport position by swinging said crank axles, connecting means adapting said axles to swing together, a third crank axle pivoted to the frame, an auxiliary wheel mounted on the crank portion of said third crank axle and spaced laterally from the plane of either of said first mentioned wheels, an arm fixed to the third crank axle, a link swingable with one of said pair of crank axles and having a hook portion adapted to engage said arm to swing the third crank axle, and cooperating means carried by said arm and link for releasing the connection between the arm and link upon continued movement of said third crank axle.

33. In a wheeled plow, the combination of at least one plow body, means running on the ground adjacent the furrow opened by said plow body for supporting the plow in furrow opening position, and auxiliary supporting means spaced laterally from said first mentioned means a distance sufficient to engage the ground and support said plow when the latter is shifted off its course sufficient to bring said first mentioned means over the furrow.

34. In a wheeled plow, the combination of means serving as a frame, at least one plow body carried thereby, and wheel means therefor having at least three ground engaging portions spaced apart laterally from each other a distance greater than the width of a furrow opened by said plow body, whereby said plow is supported at two laterally spaced points when the plow has been shifted laterally sufficient to bring one of said ground engaging portions over said furrow.

WILLIAM L. PAUL.